United States Patent
Hoogerbrugge et al.

(10) Patent No.: US 10,824,560 B2
(45) Date of Patent: Nov. 3, 2020

(54) USING A MEMORY SAFETY VIOLATION INDICATOR TO DETECT ACCESSES TO AN OUT-OF-BOUNDS OR UNALLOCATED MEMORY AREA

(71) Applicant: NXP B.V., Eindhoven (NL)

(72) Inventors: Jan Hoogerbrugge, Helmond (NL); Marcel Medwed, Graz (AT); Ventzislav Nikov, Haasrode (BE); Asier Goikoetxea Yanci, Glasgow (GB)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/278,246

(22) Filed: Feb. 18, 2019

(65) Prior Publication Data
US 2020/0264976 A1 Aug. 20, 2020

(51) Int. Cl.
*G06F 12/0802* (2016.01)
*G06F 12/0804* (2016.01)
*G06F 21/78* (2013.01)
*G06F 21/79* (2013.01)

(52) U.S. Cl.
CPC ...... *G06F 12/0802* (2013.01); *G06F 12/0804* (2013.01); *G06F 21/78* (2013.01); *G06F 21/79* (2013.01); *G06F 2212/60* (2013.01)

(58) Field of Classification Search
CPC .. G06F 12/0802; G06F 2212/60; G06F 21/50; G06F 21/52; G06F 21/78; G06F 21/79; G06F 12/14; G06F 12/0804
See application file for complete search history.

(56) References Cited

U.S. PATENT DOCUMENTS

| 7,673,345 B2 * | 3/2010 | Cheng ............ G06F 12/1063 726/26 |
| 8,117,399 B2 | 2/2012 | Greenberg et al. |
| 9,123,444 B2 | 9/2015 | Subramaniam et al. |

(Continued)

OTHER PUBLICATIONS

Sinha, Kanad et al.; "Practical Memory Safety with REST;" 45th International Symposium on Computer Architecture—ISCA 2018; Jun. 4-6, 2018; Los Angeles, CA; doi>10.1109/ISCA.2018.00056, pp. 1-12.

*Primary Examiner* — Glenn Gossage
(74) *Attorney, Agent, or Firm* — Daniel D. Hill

(57) ABSTRACT

A data processing system and method for protecting a memory from unauthorized accesses are provided. The data processing system includes a system bus, a memory coupled to the system bus through a memory controller, and a processing core including a cache system. The memory controller is coupled to the system bus for controlling accesses to the memory that are requested by the processing core. A memory protection circuit uses one or more memory safety violation (MSV) indicators stored in out-of-bounds areas of the memory for detecting when the processing core attempts to access an out-of-bounds area of the memory. The processing core generates an error signal, such as an interrupt, when an attempt to access the out-of-bounds area is detected. The out-of-bounds area may be an unallocated area of the memory. The MSV indicator may be written to the memory by executing a flush instruction of the cache system, and may include the same number of bits as a cache line of the cache system. A data value of the MSV indicator may be a secret data value.

18 Claims, 3 Drawing Sheets

(56) References Cited

U.S. PATENT DOCUMENTS

| | | | |
|---|---|---|---|
| 9,678,899 B2* | 6/2017 | Humphries | G06F 12/1491 |
| 2013/0283126 A1 | 10/2013 | Ramaraju | |
| 2014/0317742 A1* | 10/2014 | Edwards | G06F 21/56 |
| | | | 726/23 |
| 2015/0278122 A1* | 10/2015 | Ono | G06F 12/145 |
| | | | 711/163 |
| 2017/0010980 A1* | 1/2017 | Bernasconi | G06F 12/1408 |
| 2019/0361616 A1* | 11/2019 | Jiang | G06F 3/0673 |

* cited by examiner

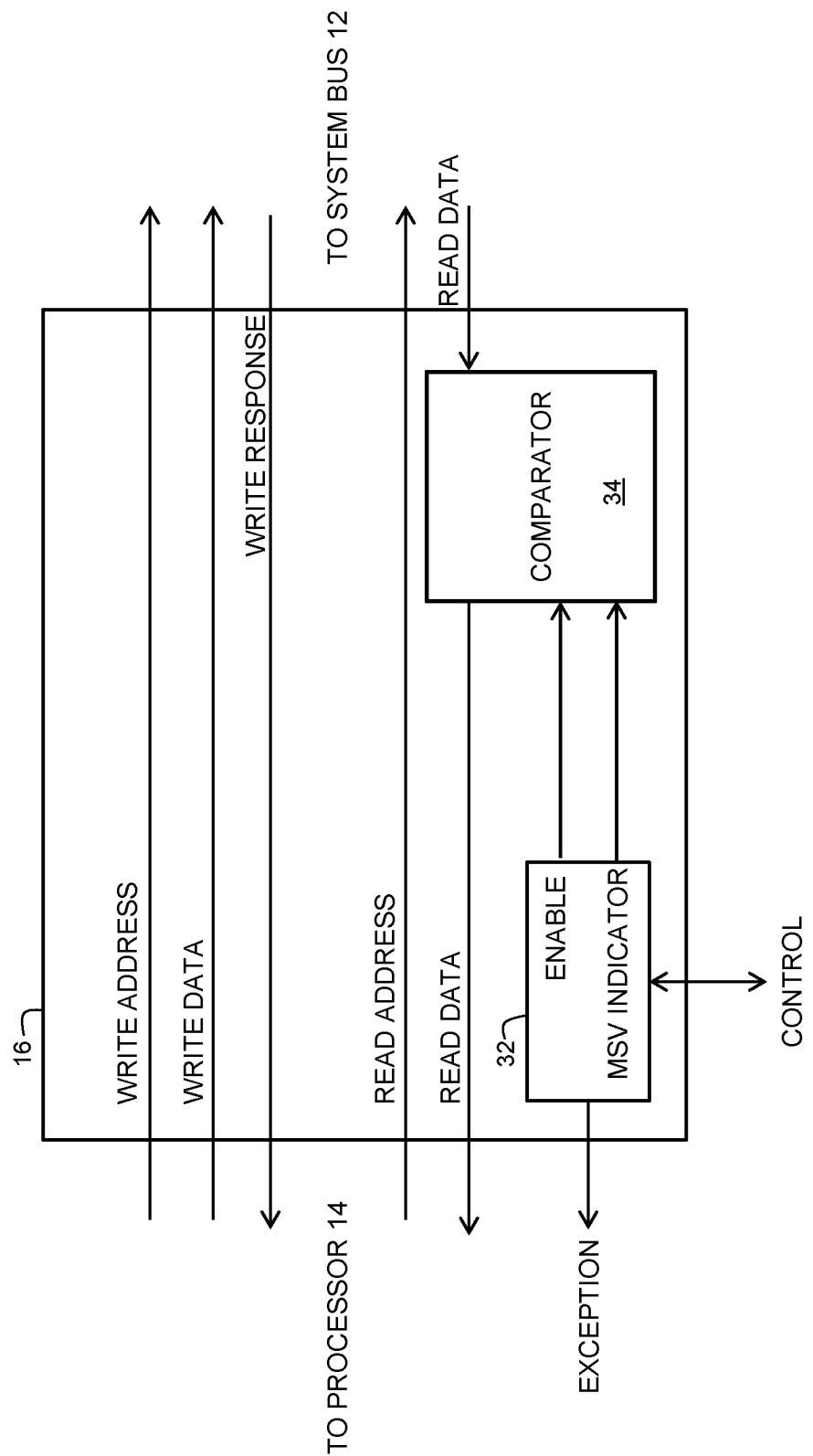

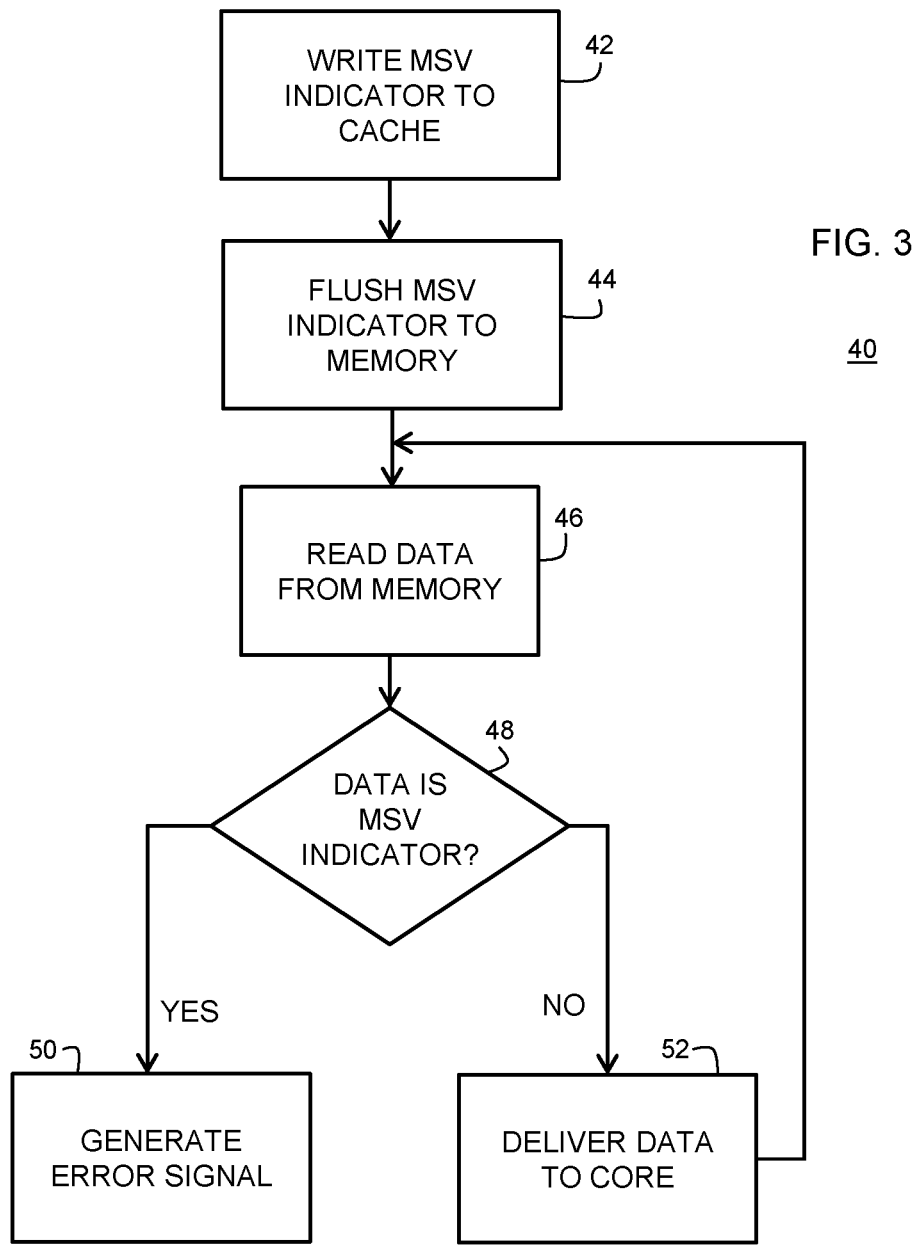

US 10,824,560 B2

USING A MEMORY SAFETY VIOLATION INDICATOR TO DETECT ACCESSES TO AN OUT-OF-BOUNDS OR UNALLOCATED MEMORY AREA

BACKGROUND

Field

This disclosure relates generally to data processing, and more particularly, to a data processing system having memory protection and method therefor.

Related Art

Many software-based data processing systems are vulnerable to security attacks because of bugs, or defects in the software. Much of this software is written in insecure programming languages, such as C and C++, where validity of memory accesses is not checked. Vulnerabilities may occur in the software when an attacker is able to let a software process running on a data processing system have access to memory areas outside of the bounds of an allocated object. Likewise, vulnerabilities may occur in the software when the allocated object is deallocated.

When looking for memory access protection against attacks, it is important that the run-time overhead of the protection be as low as possible. This typically means that the memory protection solutions involve hardware changes to a processor core as well as compiler changes. These hardware solutions may also add instructions to the processor core instruction set. These hardware and instruction set modifications can be impractical as well as expensive.

Therefore, a need exists for a memory protection solution that has low run-time overhead while, at the same time, not requiring modification of a processor core or instruction set.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates the memory protection circuit of FIG. 1 in more detail.

FIG. 3 illustrates a method for protecting a memory of the data processing system of FIG. 1.

DETAILED DESCRIPTION

Figure 1:
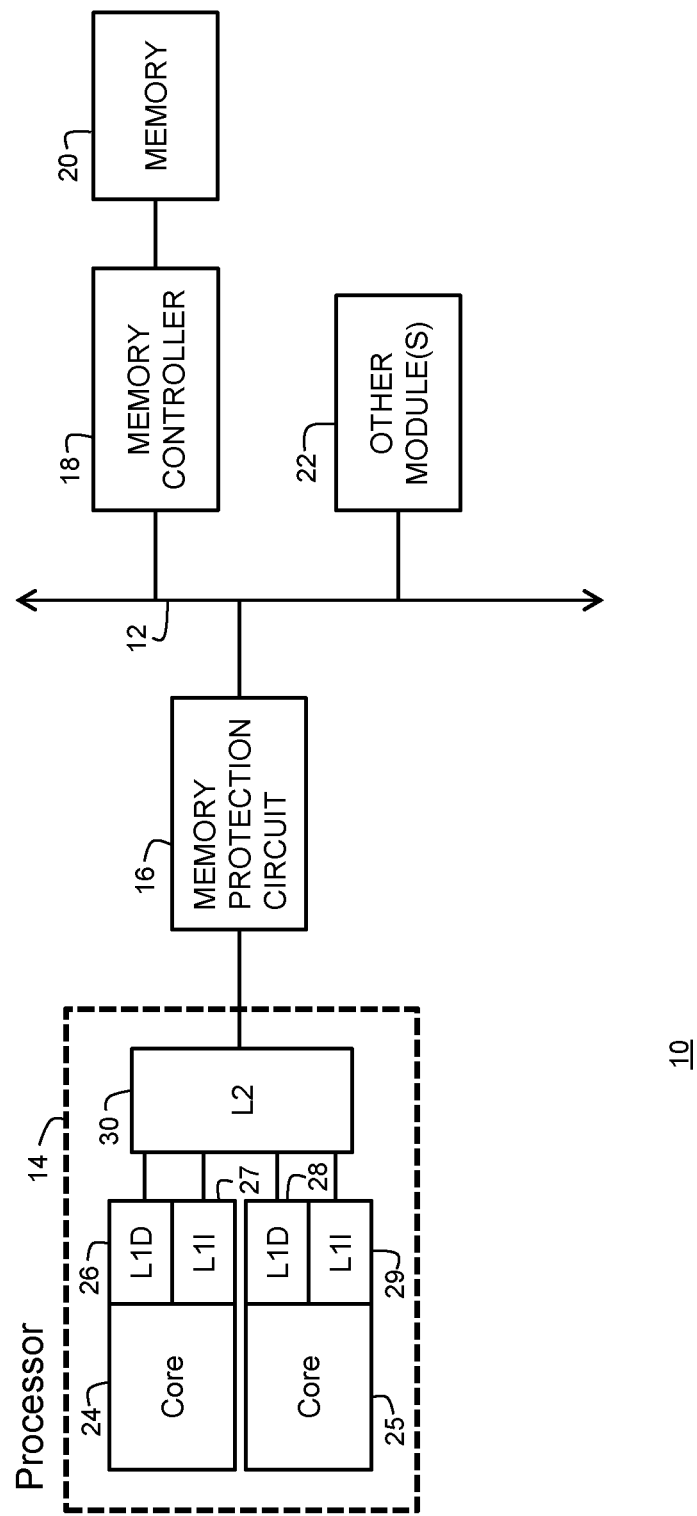
FIG. 1 illustrates a data processing system in accordance with an embodiment.

Generally, there is provided, a data processing system and method for protecting a memory of the data processing system from unauthorized accesses. The memory is protected using secret memory safety violation (MSV) indicators written to unallocated memory locations of a memory that is external to a processing core. In one embodiment, the MSV indications may be placed on both sides of an allocated memory area. In one embodiment, the data processing system includes a processor having one or more processing cores for executing instructions retrieved from a cache system. The cache system may include multiple levels of cache memory and an external main memory. When the instructions or data needed for execution by one of the processing cores is not located in the cache system, the processor generates a cache miss which causes data to be retrieved from an external memory location. The retrieved data passes through a memory protection circuit on its way to the processing core that requested the data. The memory protection circuit checks the retrieved data to determine if it came from an out-of-bounds, or unallocated, memory location by determining if the retrieved read data from the memory matches an MSV indicator. In one embodiment, the MSV indicator has the same number of bits as a cache line. A match indicates the retrieved data is from an unallocated memory location. In response to the match, an error signal is generated. In one embodiment, the error signal is an exception, informing the processing cores of an invalid memory access, and causing the access to be stopped.

The MSV indicators may be placed around allocated objects in unallocated memory areas to protect against the out-of-bounds accesses as well as to protect against use-after-free accesses. The MSV indicators are written to the unallocated memory locations by writing the out-of-bounds indicators to the cache system and then causing a processing core to execute a conventional flush instruction in the cache system. The flush instruction causes the MSV indicator to be removed from the cache and flushed to the external memory location. The MSV indicators can be removed from the memory by executing a conventional allocation instruction for allocating a cache line without fetching the cache line from memory and initializing the cache line with a value, such as all zeros.

The data processing system provides for memory protection without requiring the modification of the processing core or instruction set that is run on the processing core. Also, because the memory protection is provided using only data that is written to the external memory, the memory protection is provided with very little memory access latency because the accesses from memory are at a normal access speed. In addition, the memory protection is provided without modification to the instruction set and only minimal hardware is added to the data processing system outside of the processing core.

In accordance with an embodiment, there is provided, a data processing system including: a system bus; a processing core having a cache system for storing information most recently accessed by the processing core, the processing core being coupled to the system bus; a memory; a memory controller coupled to the memory and to the system bus for controlling accesses to the memory requested by the processing core; and a memory protection circuit coupled to the system bus and to the processing core, the memory protection circuit using a memory safety violation (MSV) indicator stored in the memory for detecting when the processing core attempts to access an out-of-bounds area of the memory, wherein the processing core generates an error signal when an attempt to access the out-of-bounds area is detected. The out-of-bounds area may be an unallocated area of the memory. A data value of the out-of-bounds indicator may be a secret data value. The MSV indicator may be written to the memory by executing a flush instruction of the cache system so that the MSV indicator is flushed from the cache system to the memory. The MSV indicator may be erased from the memory by overwriting a data value of the MSV indicator with a predetermined value. The MSV indicator may include the same number of bits as a cache line of the cache system. The error signal may be characterized as being an interrupt, the interrupt stopping execution of a process that generated the attempted access to the out-of-bounds area of the memory. The cache system may include a level-1 cache and a level-2 cache, the level-1 cache may include an instruction cache and a data cache, the level-2 cache may be coupled to the level-1 cache and for provide the information to the level-1 cache, the MSV indicator may be stored in a memory location corresponding to the data cache. The memory protection circuit may check all data read from the memory by the processing core for requests for data from the out-of-bounds area of the memory.

In another embodiment, there is provided, a data processing system including: a system bus; a processing core having a cache system comprising a level-1 cache and a level-2 cache, the level-1 cache for storing information most recently accessed by the processing core, the level-2 cache coupled to the level-1 cache and for providing the information to the level-1 cache, the processing core being coupled to the system bus; a memory; a memory controller coupled to the memory and to the system bus for controlling accesses to the memory requested by the processing core; and a memory protection circuit coupled to the system bus and to the processing core, the memory protection circuit using an MSV indicator stored in the memory for detecting when the processing core attempts to access an unallocated area of the memory, wherein the processing core generates an interrupt when an attempt to access the unallocated area of the memory is detected. The MSV indicator may be a data value stored in the memory and the data value may include the same number of bits as a cache line of the cache system. The MSV indicator may be written to the memory by executing a flush instruction of the cache system so that the MSV indicator is flushed from the cache system to the memory. The MSV indicator may be removed from the memory by unallocating a cache line of the cache system without fetching the unallocated cache line from the cache system and filling all the bit locations of the unallocated cache line with zeros. The interrupt may be characterized as being an exception that stops execution of a software process running on the processing core that attempted the access to the unallocated area of the memory. The level-1 cache may include an instruction cache and a data cache, wherein the MSV indicator may be stored in a memory location corresponding to the data cache.

In yet another embodiment, there is provided, in a data processing system having a processing core and a cache system, the cache system for providing information used by the processing core to execute instructions, the processing core and the cache system coupled to a system bus, a memory coupled to the system bus for providing the information to the cache system, a method for protecting the memory from unauthorized accesses, the method comprising: writing a MSV indicator into the memory; monitoring accesses to the memory by the processing core; detecting when the processing core attempts to access the MSV indicator; and generating an interrupt in response to detecting the processing core accessing the memory safety violation indicator. Writing the MSV indicator may include writing the MSV indicator having the same number of bits as a cache line in the cache system. A data value of the MSV indicator is a secret. Writing the MSV indicator into the memory may further include writing the MSV indicator to the cache system and then executing a flush instruction that moves the MSV indicator to the memory. Generating an interrupt may further include raising an exception that stops execution of a process that is running on the processing core that attempted accessing the MSV indicator.

FIG. 1 illustrates data processing system 10 in accordance with an embodiment. Data processing system 10 may be implemented on one or more integrated circuits and may be implemented in hardware, software, or a combination of hardware and software. Data processing system 10 includes system bus 12, processor 14, memory controller 18, memory 20, and other modules(s) 22. Processor 14 may be any hardware device capable of executing instructions. Processor 14 may be, for example, a microprocessor, field programmable gate array (FPGA), application-specific integrated circuit (ASIC), or similar device. As illustrated, processor 14 may include one or more processing cores. System bus 12 includes a plurality of conductors that provides an interconnect for communicating address, data, and control information between the various modules of data processing system 10. There may be more than one bus structure in a data processing system, and there are several different ways to implement system bus 12. For example, system bus 12 may follow the AXI (Advanced eXtensible Interface) protocol as used in, e.g., ARM processors. In another embodiment, system bus 12 may be implemented as a crossbar switch. Processor 14 includes processing cores 24 and 25, level-1 cache memories 26-29, and level-2 cache memory 30. Level-1 data (L1D) cache memory 26 and level-1 instruction (L1I) cache memory 27 are connected to processing core 24, and level-1 data (L1D) cache memory 28 and level-1 instruction (L1I) cache memory 29 are connected to processing core 25. Level-2 cache memory 30 is connected to provide data and instructions to level-1 cache memories 26-29. The number of levels in the cache system is not important for describing the embodiment, and there may be more or fewer levels in the cache system of processor 14. Memory protection circuit 16 is connected to level-2 cache memory 30 and to system bus 12. Memory 20 is connected to system bus 12 via memory controller 18. Memory 20 may be characterized as a main memory. Memory 20 may be implemented on the same integrated circuit as data processing system 10 or may be implemented separately. Memory 20 may include volatile memory such as static random-access memory (static RAM) or (SRAM) or dynamic RAM (DRAM), or may include non-volatile memory such as flash memory, read only memory (ROM), or other volatile or non-volatile memory. Other modules 22 is connected to system bus 12. Other module(s) 22 can be one or more modules that provides additional functionality to data processing system 10. For example, other module(s) 22 may include another memory or register file having any type of volatile or non-volatile memory cell. Also, other module(s) 22 may provide any type of functionality. For example, other module(s) 22 may be one or more of a universal asynchronous receiver-transmitter (UART), a serial-peripheral interface (SPI), modem, controller area network (CAN), phase-locked loop (PLL), analog-to-digital converter (ADC), etc.

FIG. 2 illustrates memory protection circuit 16 of FIG. 1 in more detail. Memory protection circuit 16 includes control circuit 32 and comparator 34. Memory protection circuit 16 is positioned between processor 14 and system bus 12. In one embodiment, conductors labeled "WRITE ADDRESS", WRITE DATA", "WRITE RESPONSE" and "READ ADDRESS" are illustrated passing through memory protection circuit 16. As can be seen, one end of the conductors is connected to processor 14 and the other end is connected to system bus 12. Note that, in FIG. 2, the write and read conductors are labeled as in the AXI bus protocol. However, as stated above, the type of bus protocol used for system bus 12 is not important and can be any bus protocol. Control circuit 32 communicates control signals with a controller (not shown) for controlling the operation of memory protection circuit 16. The controller functionality may be provided by processor 14. Control circuit 32 includes one or more registers, or other type of memory elements for storing one or more memory safety violation (MSV) indicators. During operation, the MSV indicators from control circuit 32 are compared with read data (READ DATA) from memory 20 by comparator 34. Each cache line of data read from memory 20 is provided from memory 20 to comparator 34 via system bus 12 for comparison with the MSV indicators stored in control circuit 32. When the read data does not match the stored MSV indicators, the read data is passed on to processor 14. If a cache line of read data does match a stored MSV indicator, then the read data is from an unallocated area of memory 20, and an error signal generated. In one embodiment, the error signal is an interrupt. In the illustrated embodiment, the error signal is a type of interrupt known as an exception (EXCEPTION). The exception stops the software process that requested the matching read data, thus protecting the read data from being accessed. In an embodiment where system bus 12 is an AXI bus, the error signal may be an SLVERR slave error. According to the AXI specification, the SLVERR error signal is returned when an access has reached a slave module successfully, but the transaction is unsuccessful, and the slave module returns an error condition to the master that originated the access. The transaction can be unsuccessful because of FIFO or buffer overrun or underrun conditions, an unsupported transfer size is attempted, write access is attempted to a read-only location, a timeout condition occurs, or the attempted access is to a disabled or powered-down function. In another embodiment, a different type of error signal may be generated. A control signal labeled "ENABLE" may be used to enable or disable comparator 34. If comparator 34 is disabled, then read data (READ DATA) passes through comparator 34 without being compared to the MSV indicator. Comparator 34 may be disabled because, e.g., certain types of accesses, such as a prefetch operation, may inadvertently generate an error signal. The embodiment illustrated in FIG. 2 only checks read data from memory 20. In another embodiment, data or instructions from another memory may be checked in addition to memory 20 or instead of memory 20.

The data value of the cache line-sized MSV indicator may be randomly selected at system boot time and may be programmed in a wide register inside of memory protection circuit 16.

FIG. 3 illustrates method 40 for protecting a memory of the data processing system 10. Method 40 begins at step 42. At step 42, one or more MSV indictors is written to cache 36. In one embodiment, the MSV indicators are written to out-of-bounds areas, or unallocated areas, of memory 20. However, with the external memory of conventional processor cores today, the MSV indicator may stay in the cache without being written to memory. To cause the MSV indicator to be written to memory 20, at step 44, a conventional flush instruction is executed to flush the MSV indicator from the cache system to memory 20. In a different embodiment, the MSV indicator may be inserted in a memory using a different instruction. As stated above, the MSV indicator may be the same size and format as a cache line of the cache system. Also, the MSV indicator is stored in a memory or register file of control circuit 32. During normal operation of data processing system 10, at step 46, data is read from memory 20 when the data is not found in level-1 data cache 26 or 28, or in level-2 cache 30. Each cache line that is read from memory 20 is compared to the MSV indicator(s) stored in control circuit 32. At decision step 48, comparator 34 compares a data read from memory 20. If there is not a match between the MSV indicator and the read data, the YES path is taken to step 52 and the data is allowed to continue past comparator 34 to processor 14. However, if there is a match between the cache line read from memory 20 and the MSV indicator stored in control circuit 32, then the YES path is taken from decision step 48 to step 50. At step 50, an error signal is generated. In the illustrated embodiment, the error signal is characterized as being an exception (EXCEPTION) as illustrated in FIG. 2. The exception will cause the process that requested the read data from memory 20 to stop, thus protecting the data from a potentially illegitimate access. Note that the read data can be data or instructions.

The addresses of allocated and unallocated areas of memory may change over time during normal operation. Therefore, it may be necessary to remove and replace the MSV indicators as needed. The MSV indicators can be removed from memory 20 by executing a conventional allocation instruction for allocating a cache line without fetching the cache line from memory and initializing the cache line with a value, such as all zeros. In another embodiment, the MSV indicators may be removed using a different instruction.

By monitoring data that is read from external memory 20, data processing system 10 provides for memory protection without requiring the modification of the processing core or instruction set that is run on the processing core. Also, because the memory protection is provided using only an out-of-bounds indicator stored in a memory array of a memory external to processor 14, memory protection is provided with very little memory access latency. In addition, memory protection is provided using existing memory access instructions without modification to the instruction set and only minimal hardware is added to data processing system 10 outside of the processing core.

To reduce memory access delay, some data processing systems prefetch data and/or instructions. During a prefetch operation of a data processing system that implements the disclosed technique, it is possible that an MSV indicator may be prefetched thus causing an error signal to be generated. This may be dealt with by either aborting prefetching of the particular data stream or by skipping the memory block or cache line that contains the MSV indicator. Another way to deal with this is to cause exception handling to be disabled. Alternately, memory protection circuit 16 may be disabled during data prefetching. Finally, any bus errors that occur during data prefetching may simply be ignored.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, non-volatile memory (NVM), and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising:
a system bus;
a processing core having a cache system for storing information most recently accessed by the processing core, the processing core being coupled to the system bus;
a memory;
a memory controller coupled to the memory and to the system bus for controlling accesses to the memory requested by the processing core; and
a memory protection circuit coupled to the system bus and to the processing core, the memory protection circuit using a memory safety violation (MSV) indicator stored in an out-of-bounds area of the memory for detecting when the processing core attempts to access the out-of-bounds area of the memory, wherein the MSV indicator is stored in the out-of-bounds area of the memory by the processing core writing the MSV indicator to the cache system and executing a flush instruction to remove the MSV indicator from the cache system and store the MSV indicator in the out-of-bounds area of the memory, and wherein the processing core generates an error signal when an attempt to access the out-of-bounds area of the memory is detected.

2. The data processing system of claim 1, wherein the out-of-bounds area of the memory is an unallocated area of the memory.

3. The data processing system of claim 1, wherein a data value of the MSV indicator is a secret data value.

4. The data processing system of claim 1, wherein the MSV indicator is erased from the memory by overwriting a data value of the memory safety violation indicator with a predetermined value.

5. The data processing system of claim 1, wherein the MSV indicator includes a same number of bits as a cache line of the cache system.

6. The data processing system of claim 1, wherein the error signal is an interrupt, the interrupt stopping execution of a process that attempted the access to the out-of-bounds area of the memory.

7. The data processing system of claim 1, wherein the cache system comprises a level-1 cache and a level-2 cache, the level-1 cache includes an instruction cache and a data cache and the level-2 cache is coupled to the level-1 cache provides and for providing the information to the level-1 cache, and the memory safety violation indicator is stored in a memory location corresponding to the data cache of the level-1 cache.

8. The data processing system of claim 1, wherein the memory protection circuit checks all data read from the memory by the processing core for requests for data from the out-of-bounds area of the memory.

9. A data processing system comprising:
a system bus;
a processing core having a cache system comprising a level-1 cache and a level-2 cache, the level-1 cache for storing information most recently accessed by the processing core, the level-2 cache coupled to the level-1 cache and for providing the information to the level-1 cache, the processing core being coupled to the system bus;
a memory;
a memory controller coupled to the memory and to the system bus for controlling accesses to the memory requested by the processing core; and
a memory protection circuit coupled to the system bus and to the processing core, the memory protection circuit causing a memory safety violation (MSV) indicator to be stored in an unallocated area of the memory by the processing core writing the MSV indicator to the level-1 cache of the cache system and the processing core executing a flush instruction to remove the MSV indicator from the cache system and provide the MSV indicator to the unallocated area of the memory, wherein the memory protection circuit detects that the processing core is attempting to access the unallocated area of the memory when a data read from the memory matches the MSV indicator.

10. The data processing system of claim 9, wherein the MSV indicator is a data value stored in the memory and the data value includes the same number of bits as a cache line of the cache system.

11. The data processing system of claim 9, further comprising the processing core generating an interrupt in response to the data read from the memory matching the MSV indicator.

12. The data processing system of claim 9, wherein the MSV indicator is removed from the memory by unallocating a cache line of the cache system without fetching the unallocated cache line from the cache system and filling all the bit locations of the unallocated cache line with zeros.

13. The data processing system of claim 9, wherein the interrupt is an exception that stops execution of a software process running on the processing core that attempted the access to the unallocated area of the memory.

14. The data processing system of claim 9, wherein the level-1 cache includes an instruction cache and a data cache, and wherein the MSV indicator is stored in a memory location corresponding to the data cache.

15. In a data processing system having a processing core and a cache system, the cache system for providing information to the processing core, the processing core and the cache system coupled to a system bus, a memory coupled to the system bus for providing the information to the cache system, a method for protecting the memory from unauthorized accesses, the method comprising:
writing a memory safety violation (MSV) indicator into the cache system;
executing a flush instruction by the processing core to remove the MSV indicator from the cache system to an out-of-bounds area of the memory;

monitoring accesses to the memory by the processing core;

detecting when the processing core attempts to access the out-of-bounds area of the memory by detecting the MSV indicator; and generating an interrupt in response to detecting the processing core attempting to access the out-of-bounds area of the memory.

16. The method of claim 15, wherein the MSV indicator has the same number of bits as a cache line in the cache system.

17. The method of claim 15, wherein a data value of the MSV indicator is a secret.

18. The method of claim 15, wherein generating the interrupt further comprises raising an exception that stops execution of a process running on the processing core that attempted to access the MSV indicator.

* * * * *